(12) United States Patent
Suzuka

(10) Patent No.: US 6,334,029 B1
(45) Date of Patent: Dec. 25, 2001

(54) CAMERA HAVING A MOTOR-DRIVEN ZOOM LENS

(75) Inventor: Shinya Suzuka, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/208,858

(22) Filed: Dec. 10, 1998

(30) Foreign Application Priority Data

Dec. 16, 1997 (JP) .................................................. 9-346180

(51) Int. Cl.⁷ ............................ G03B 17/00; G03B 17/02
(52) U.S. Cl. ........................... 396/85; 396/439; 396/539
(58) Field of Search .............................. 396/72, 85, 349, 396/439, 535, 538, 539, 541

(56) References Cited

U.S. PATENT DOCUMENTS

| | | | |
|---|---|---|---|
| 4,323,303 | * 4/1982 | Enomoto | 354/25 |
| 4,351,599 | * 9/1982 | Suzuki et al. | 354/288 |
| 4,974,949 | 12/1990 | Tanaka | 350/429 |
| 5,083,146 | 1/1992 | Ueda | 354/149.1 |
| 5,305,038 | 4/1994 | Mogamiya | 354/195.12 |
| 5,349,408 | 9/1994 | Nomura et al. | 354/195.1 |
| 5,430,516 | 7/1995 | Uziie et al. | 354/195.1 |
| 5,475,456 | 12/1995 | Haraguchi et al. | 354/187 |
| 5,701,208 | 12/1997 | Sato et al. | 359/822 |
| 5,701,531 | * 12/1997 | Tanaka et al. | 396/319 |
| 5,708,884 | 1/1998 | Morishita | 396/349 |
| 5,737,644 | 4/1998 | Nomura et al. | 396/72 |
| 5,742,850 | 4/1998 | Nomura et al. | 396/72 |
| 5,774,748 | 6/1998 | Ito et al. | 396/80 |
| 5,784,653 | 7/1998 | Nomura et al. | 396/87 |
| 5,870,645 | * 2/1999 | Tanbara et al. | 396/539 |
| 5,884,105 | 3/1999 | Nomura et al. | 396/72 |
| 5,886,830 | 3/1999 | Oono et al. | 359/696 |
| 5,886,831 | 3/1999 | Oono et al. | 359/699 |
| 5,886,836 | 3/1999 | Sasaki et al. | 396/72 |
| 5,890,027 | * 3/1999 | Ohta et al. | 396/535 |
| 5,892,999 | 4/1999 | Nomura et al. | 396/462 |
| 5,909,320 | 6/1999 | Oono et al. | 359/696 |
| 5,930,053 | 7/1999 | Oono et al. | 359/696 |
| 5,940,223 | 8/1999 | Yoshida et al. | 359/699 |
| 5,956,533 | 9/1999 | Endo et al. | 396/85 |
| 5,991,097 | 11/1999 | Nomura et al. | 359/700 |

* cited by examiner

Primary Examiner—Christopher E. Mahoney
(74) Attorney, Agent, or Firm—Greenblum & Bernstein, P.L.C.

(57) ABSTRACT

A camera includes a rotatable zoom lens barrel which moves along an optical axis when rotated about the optical axis relative to a camera body. A motor having a drive shaft and a motor accommodating member in which the motor is provided, are positioned in the camera body. A gear train for transmitting rotation of the drive shaft to the zoom lens barrel, and a gear train accommodating member in which at least part of the gear train is provided, are positioned in the camera body. A battery chamber in which a battery may be loaded is positioned in the camera body. The motor accommodating member, the gear train accommodating member and the battery chamber are formed as one unit to be secured to the camera body.

14 Claims, 3 Drawing Sheets

CAMERA HAVING A MOTOR-DRIVEN ZOOM LENS

BACKGROUND OF THE INVENTION

1. Field of the Invention

The present invention relates to a camera having a motor-driven zoom lens incorporated with the camera.

2. Description of the Related Art

In a conventional camera having a motor-driven zoom lens incorporated therewith, a zoom lens drive mechanism portion which includes a zooming motor and a gear train, a battery chamber for accommodating a battery for supplying electric power to the zooming motor, and other portions of the camera are separately provided as independent parts of the camera body (main body). These portions are individually fixed to the camera body in assembly of the camera.

However, it is not easy to space-efficiently design and arrange these portions within the camera, which makes it difficult to design the camera small and compact. Furthermore, it is time-consuming as these portions need to be fixed to the camera body individually.

SUMMARY OF THE INVENTION

The primary object of the present invention is to provide a camera having a motor-driven zoom lens which has an interior structure that enables a small and compact camera design and also facilitates the assembly of the camera.

To achieve the object mentioned above, according to an aspect of the present invention, there is provided a camera including: a rotatable zoom lens barrel which moves along an optical axis when rotated about the optical axis relative to a camera body; a motor having a drive shaft; a motor accommodating member, positioned in the camera body, in which the motor is provided; a gear train for transmitting rotation of the drive shaft to the zoom lens barrel; and a gear train accommodating member, positioned in the camera body, in which at least part of the gear train is provided; and a battery chamber, positioned in the camera body, in which a battery is loaded, wherein the motor accommodating member, the gear train accommodating member and the battery chamber are formed as one unit to be secured to the camera body.

Preferably, the motor accommodating member is formed to correspond to a shape of the motor.

Preferably, the motor is in the shape of a cylinder, the motor accommodating member being formed having a substantially cylindrical shape.

Preferably, the battery includes at least one cylindrical cell, the battery chamber being formed having a substantially cylindrical shape.

Preferably, the gear train accommodating member includes a plurality of small stub-axles on which corresponding gears of the gear train are rotatably fitted.

Preferably, the camera includes a cylindrical film chamber, the unit being positioned adjacent to the film chamber so that the axis of the cylindrical shape of the motor accommodating member extends substantially parallel to the axis of the cylindrical film chamber.

Preferably, the camera includes a cylindrical film chamber, the unit being positioned adjacent to the film chamber such that the axis of the cylindrical shape of the battery chamber extends substantially parallel to an axis of the film chamber.

Preferably, the gear train accommodating member is positioned between the zoom lens barrel and the zoom motor accommodating member.

Preferably, the camera body includes a grip portion, the unit being positioned inside the grip portion.

According to another aspect of the present invention, there is provided a camera having a zoom lens barrel driven by a motor to perform zooming, the camera including: a gear train for transmitting rotation of the motor to the zoom lens barrel; and an accommodating unit, provided as a separate part from the camera body of the camera, which is to be secured to the camera body when the camera is assembled, the accommodating unit including: a motor acommodating portion for accommodating the motor; a gear train accommodating portion for accommodating the gear train; and a battery chamber.

Preferably, the camera body includes a grip portion, the accommodating unit being positioned inside the grip portion.

Preferably, the camera body includes a film chamber, the accommodating unit being positioned in front of, and adjacent to, the film chamber.

The present disclosure relates to subject matter contained in Japanese Patent Application No. 9-346180 (filed on Dec. 16, 1997) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

A camera 10 having a camera body 11 is provided, at the approximate center of the front thereof, with a zoom lens barrel 12. The zoom lens barrel 12 is provided around the outer periphery thereof with a large-diameter zoom gear 12a. The zoom lens barrel 12 advances from and retracts into the camera body 11 along an optical axis O to change the focal length when the zoom gear 12a is driven to rotate in forward and reverse directions, respectively.

Figure 2:
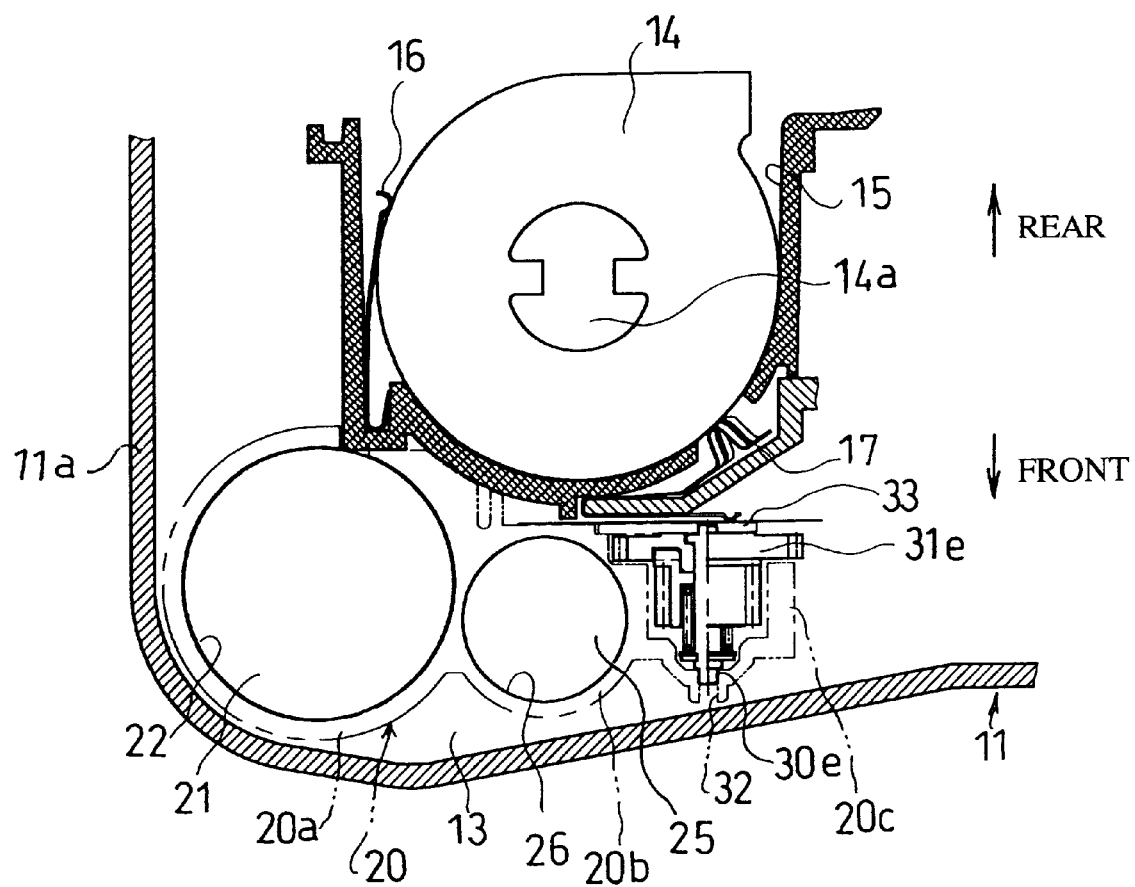
FIG. 2 is a cross sectional view of part of the camera, taken along the II—II line shown in FIG. 1.

As shown in FIG. 2, part of the front of the camera body 11 bulges forwardly (downwardly as viewed in FIG. 2) to form a grip portion 13 of the camera 10. The camera 10 is provided, behind the front of the grip portion 13 within the camera body 11, with a film chamber 15 in which a film cassette 14 is accommodated. The camera body 11 is provided on the back thereof with a back lid (not shown), and the film cassette 14 is loaded into or taken out of the camera body 11 upon the back lid being opened. The film cassette 14 is appropriately accommodated in the closed space formed by the film chamber 15, and part of the back lid upon the back lid being closed. When the film cassette 14 is positioned in the film chamber 15, a film spool 14a of the film cassette 14 extends in the vertical direction of the camera body 11. A leaf spring 16 for pressing the film cassette 14 to stably position the same in the film chamber 15 is fixed to an inner wall of the film chamber 15. Numeral 17 designates electrical contacts 17 for reading the DX code of the film cassette 14.

The camera 10 is provided in the grip portion 13 with an accommodating unit 20 which is composed of a battery chamber 20a, a zooming motor accommodating portion 20b and a reduction-gear-train accommodating portion 20c. The accommodating unit 20 is made of plastic as an integral member. The accommodating unit 20 is secured to and positioned within the camera body 11 in a space between the front wall of the camera body 11 and the film chamber 15 in forward-rearward direction of the camera body 11 (vertical direction as viewed in FIG. 2) and between the zoom lens barrel 12 and a side wall 11a of the camera body 11 in right-left direction of the camera body 11 (horizontal direction as viewed in FIG. 2). In a state where the accommodating unit 20 is fixed to the camera body 11, the reduction-gear-train accommodating portion 20c, the zooming motor accommodating portion 20b and the battery chamber 20a are positioned in this order from one side of the zoom lens barrel 12 toward the side wall 11a in the right-left direction of the camera body 11. The accommodating unit 20 can be directly fixed to any inner stationary part of the camera body 11 or can be fixed to any inner stationary portion of the camera body 11 via; e.g., to a housing secured to the zoom lens barrel 12.

The battery chamber 20a has a cylindrical space 22 whose shape corresponds to that of a cylindrical cell 21. The cylindrical space 22 is formed such that the axis thereof extends substantially parallel to the film spool 14a, whereby the cell 21 is accommodated in the battery chamber 20a with the axis of the cell 21 extending along the vertical direction of the camera body 11. The bottom of the battery chamber 20a is opened to form a battery insertion opening (not shown) through which the cell 21 can be inserted into the battery chamber 20a. The camera 10 is provided at the bottom of the camera body 11 with a battery chamber lid 9 for opening and closing the battery insertion opening. The battery chamber lid 9 is provided on its inner wall with a lower electrical contact (not shown) which contacts one end (positive terminal) of the cell 21 when the battery chamber lid 9 is closed with the cell 21 in the battery chamber 20a. The battery chamber 20a is provided at its upper end 23 with an upper electrical contact 24 which is in spring contact with the other end (negative terminal) of the cell 21 when the cell 21 is accommodated in the battery chamber 20a. The upper and lower electrical contacts are provided as elements of a power source circuit of the camera 10.

The zooming motor accommodating portion 20b is provided with a cylindrical space 26 whose shape corresponds to that of a cylindrical zooming motor 25. The cylindrical space 26 is formed such that the axis thereof extends substantially parallel to the film spool 14a, similar to the cylindrical space 22, wherein the zooming motor 25 is accommodated in the zooming motor accommodating portion 20b with the axis of the zooming motor 25 extending along the vertical direction of the camera body 11. The zooming motor accommodating portion 20b is provided at its top with an opening 27 through which the zooming motor can be inserted into the cylindrical space 26. The zooming motor 25 is positioned in the cylindrical space 26 with a drive shaft 25a extending downwards. A worm 28 is fixed on the drive shaft 25a to be adjacent to the reduction-gear-train accommodating portion 20c so as to be engaged with the large gear (worm wheel) of a composite gear 31a positioned in the reduction-gear-train accommodating portion 20c. The zooming motor 25 is electrically connected to the aforementioned power source circuit via a zooming control circuit (not shown) provided in the camera 10. The camera 10 is provided on the camera body 11 with an operational knob or switch (not shown) to effect zooming. In accordance with the operation of the operational knob or switch, the zooming control circuit controls the zooming motor 25 to rotate the drive shaft 25a forwardly or reversely or to stop the same by controlling power supply to the zooming motor 25.

As shown in FIG. 2, the film chamber 15 is formed having a part-cylindrical shape, so that a space within the camera body 11 between the bulged front portion of the film chamber 15 and the front wall of the camera body 11 is narrow. The cylindrical space 26, in which the zooming motor 25 is positioned, is smaller in diameter than the cylindrical space 22, in which the cell 21 is positioned. The accommodating unit 20 is secured to the camera body 11 with the cylindrical space 26 being positioned in the aforementioned narrow space between the bulged front part of the film chamber 15 and the front wall of the camera body 11.

Figure 3:
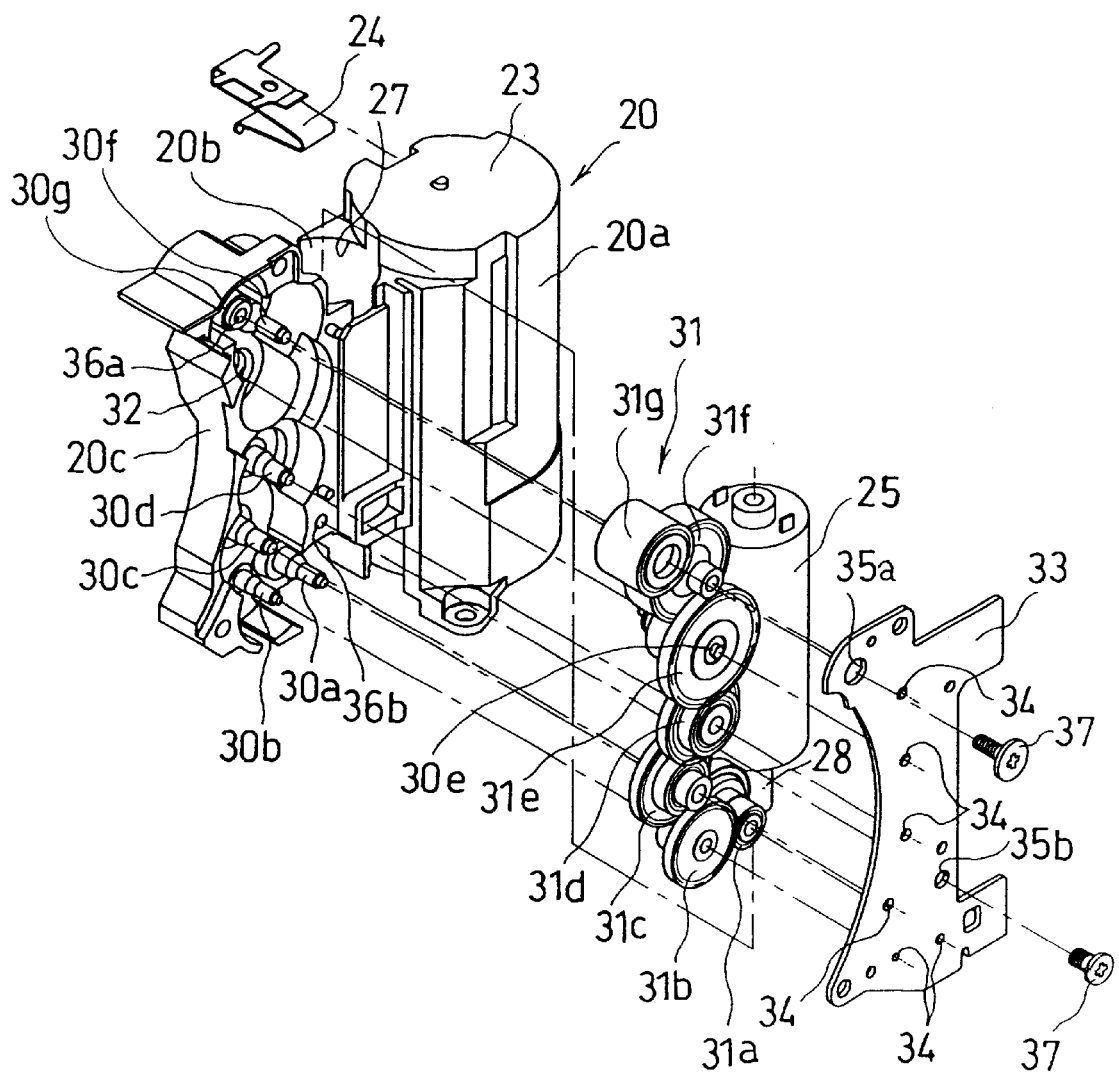
FIG. 3 is an exploded perspective view of an accommodating unit and related parts accommodated and supported by the accommodating unit.

A plurality of small stub-axles 30a, 30b, 30c, 30d, 30f and 30g are formed integrally with the reduction-gear-train accommodating portion 20c to extend substantially parallel to the optical axis O. Composite gears 31a, 31b, 31c and 31d each compose two gears (small and large gears) and are rotatably fitted onto the small stub-axles 30a, 30b, 30c, 30d, respectively. Spur gears 31f and 31g are rotatably fitted on the small stub-axles 30f and 30g, respectively. A composite gear 31e composed of two gears (small and large gears) is positioned between and engaged with the two composite gears 31d and 31f. The composite gear 31e is formed integral with its small stub-axle 30e as can be seen in FIG. 3. The composite gears 31a, 31b, 31c, 31d, 31e, 31f and 31g together constitute a reduction gear train 31. One end of the small stub-axle 30e of the composite gear 31e is rotatably fitted into an axle-hole 32 formed on the reduction-gear-train accommodating portion 20c. Upon one end of the small stub-axle 30e being properly fitted into the axle-hole 32, the small stub-axle 30e extends substantially parallel to the optical axis O, similar to the other small stub-axles 30a, 30b, 30c, 30d, 30f and 30g. The zoom lens drive mechanism of the camera 10 is composed of the zooming motor 25 and the reduction gear train 31.

In a state where all the gears of the reduction gear train 31 are arranged on the reduction-gear-train accommodating portion 20c, the worm gear of the composite gear 31a is engaged with the worm 28 of the zooming motor 25. The small gear of the composite gear 31a is engaged with the large gear of the composite gear 31b. Likewise, the small gears of the composite gears 31b, 31c and 31d are engaged with the large gears of the composite gears 31c, 31d and 31e, respectively. The small gear of the composite gear 31e is engaged with the spur gear 31f while the spur gear 31f is engaged with the spur gear 31g.

A supporting plate 33 is secured to the reduction-gear-train accommodating portion 20c to support the reduction gear train 31. The supporting plate 33 is provided with a plurality of axle-holes 34 for supporting the corresponding ends of the small stub-axles 30a through 30f. The supporting plate 33 is further provided with two holes 35a and 35b while the reduction-gear-train accommodating portion 20c is provided with corresponding two holes 36a and 36b. The supporting plate 33 is secured to the reduction-gear-train accommodating portion 20c by screwing a set screw 37 into each of the holes 36a and 36b and through the corresponding holes 35a and 35b, respectively.

In the assembling process of the reduction gear train 31, all the gears of the reduction gear train 31 are firstly arranged on the reduction-gear-train accommodating portion 20c, and subsequently the supporting plate 33 is placed on the reduction-gear-train accommodating portion 20c with all the free ends of the small stub-axles 30a through 30f being properly fitted in the respective axle-holes 34. Thereafter a set screw 37 is screwed into each of the holes 36a and 36b and through the corresponding hole 35a or 35b of the supporting plate 33. Consequently, all the gears of the reduction gear train 31 are firmly supported in the reduction-gear-train accommodating portion 20c between the reduction-gear-train accommodating portion 20c and the supporting plate 33, without dropping out therefrom.

Figure 1:
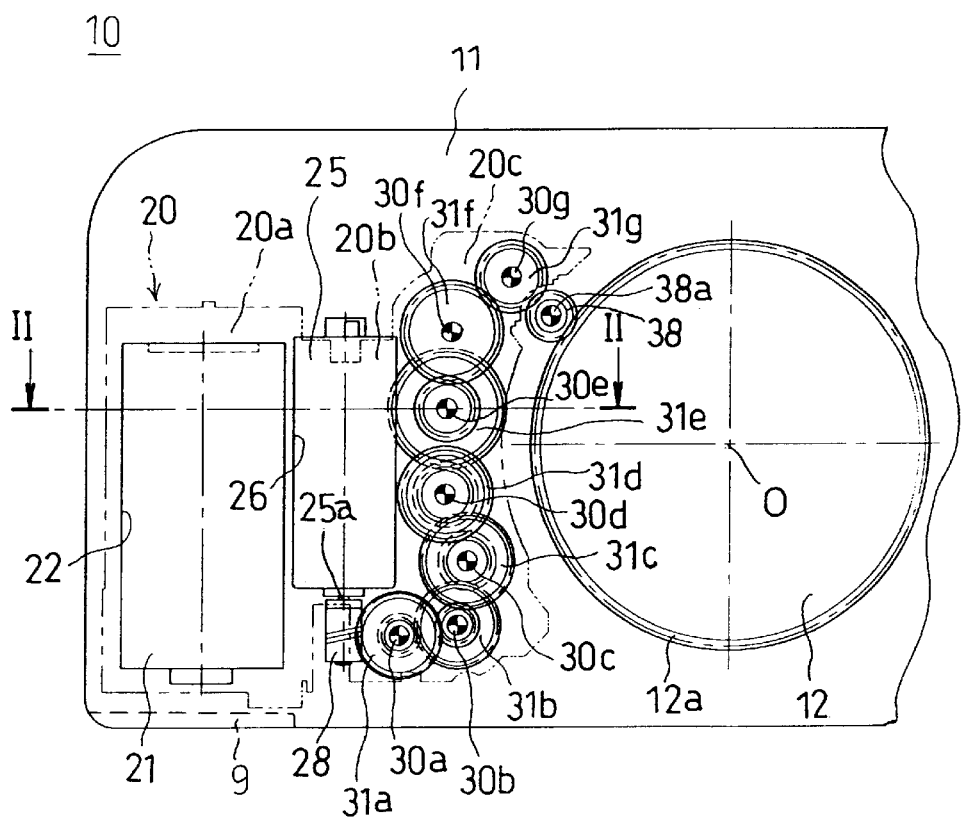
FIG. 1 is a front view of part of the interior of a camera having a motor-driven zoom lens to which the present invention is applied.

In a state where the reduction gear train 31 is assembled in the accommodating unit 20, the reduction gear train 31 is positioned in a space between the zooming motor 25 and the zoom lens barrel 12 to be aligned substantially in the vertical direction of the camera body 11, as can be seen from FIG. 1.

The camera 10 is provided, between the zoom gear 12a and the spur gear 31g in the camera body 11, with a pinion gear 38 which is rotationally fitted on a rotational axis 38a extending parallel to the optical axis O. The pinion gear 38 stays in mesh with the zoom gear 12a. The pinion gear 38 is engaged with the spur gear 31g when the accommodating unit 20 is properly set inside the camera body 11.

Accordingly, rotation of the drive shaft 25a of the zooming motor 25 is transmitted to the reduction gear train 31 via the worm 28 and the worm wheel of the composite gear 31a. The transmitted rotation is reduced in speed by the reduction gear train 31 to be transmitted to the zoom gear 12a via the pinion gear 38. Through such a zoom lens drive mechanism the zoom lens barrel 12 advances or retreats along the optical axis O in accordance with the rotational direction of the drive shaft 25a of the zooming motor 25 to thereby vary the focal length; i.e., perform zooming.

In the illustrated embodiment to which the present invention is applied, the camera 10 is successfully made small and compact by forming the battery chamber 20a, the zooming motor accommodating portion 20b and the reduction-gear-train accommodating portion 20c as one unit (i.e., the accommodating unit 20), which makes it possible to space-efficiently arrange the battery chamber 20a, and accommodating portions 20b and 20c within the camera body 11, without consuming much internal space of the camera body 11. In addition, the accommodating unit 20 can be secured to the camera body 11 therein after the reduction gear train 31, the zooming motor 25 and other parts are all fixed onto the accommodating unit 20, wherein the zoom lens drive mechanism and the battery chamber 20a can be assembled at one time, which facilitates assembly of the camera 10. As can be seen from FIG. 2, space in the grip portion 13 is efficiently used by positioning the accommodating unit 20 in the grip portion 13, which bulges forwardly from the camera body 11. It should be noted that the zooming motor 25 can be secured to the accommodating unit 20 after the unit 20 is secured to the camera body 11.

In a camera such as the illustrated embodiment of the camera 10 which has a camera body of an oblong box shape and a zoom lens barrel provided at the front center portion of the camera body, the film chamber and the spool chamber are generally located at respective ends (right and left ends) in the camera body with each axis of the film chamber and the spool chamber extending in the vertical direction of the camera. In order to arrange the accommodating unit 20 in the camera body 11 in a space-efficient manner, in the case where the accommodating unit 20 is to be positioned adjacent to the film chamber 15, it is preferable to design the zooming motor accommodating portion 20b and the battery chamber 20a to have their axes extending substantially parallel to the axis of the film chamber 15. Since the camera 10 is designed to have such a structure, the accommodating unit 20 is successfully positioned adjacent to the film chamber 15 without consuming much space within the camera body 11.

Furthermore, since the accommodating unit 20 is formed such that the reduction gear train 31 is positioned in a space between the zoom motor 25 and the zoom lens barrel 12, the space is utilized in a more space-efficient manner. In order to obtain a predetermined reduction speed ratio in such a limited space, the reduction gear train 31 is positioned to extend substantially in the vertical direction of the camera body 11, similarly to the axes of the zooming motor 25 and cell 21. This makes it possible to utilize the limited space in a space-efficient manner.

In the illustrated embodiment, the zooming motor 25 is positioned with its drive shaft 25a extending downwards wherein the rotation of the drive shaft 25a is transmitted from lower side (drive shaft 25a) to upper side (pinion gear 38) in the camera body 11. However, the zooming motor 25 can be positioned with its drive shaft 25a extending upwards. In this case, the reduction gear train 31 is reversely arranged, while the pinion gear 38 is arranged at the lower side of the camera body 11 wherein the rotation of the drive shaft 25a is transmitted from upper side to lower side in the camera body 11.

In the illustrated embodiment, all the gears of the reduction gear train 31 are supported by the accommodating unit 20. However, some gears of the reduction gear trains 31 can be supported by another portion secured to the camera body 11, as long as all the gears of the reduction gear train 31 are properly engaged after the accommodating unit 20 is secured to the camera body 11 therein.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A camera comprising:
   a rotatable zoom lens barrel which moves along an optical axis when rotated about said optical axis relative to a camera body;
   a motor having a drive shaft;
   a motor accommodating member, positioned in said camera body, in which said motor is provided;
   a gear train for transmitting rotation of said drive shaft to said zoom lens barrel;
   a gear train accommodating member, positioned in said camera body, in which at least part of said gear train is provided; and
   a battery chamber, positioned in said camera body, in which a battery is loaded, said motor accommodating member, said gear train accommodating member and said battery chamber being formed as a single unit, said single unit configured to be secured to said camera body.

2. The camera according to claim 1, wherein said motor accommodating member is formed to correspond to a shape of said motor.

3. The camera according to claim 2, wherein said motor is in the shape of a cylinder, said motor accommodating member being formed having a substantially cylindrical shape.

4. The camera according to claim 3, wherein said camera comprises a cylindrical film chamber, said unit being positioned adjacent to said film chamber so that the axis of said cylindrical shape of said motor accomodating member extends substantially parallel to the axis of said cylindrical film chamber.

5. The camera according to claim 1, wherein said battery comprises at least one cylindrical cell, said battery chamber being formed having a substantially cylindrical shape.

6. The camera according to claim 5, wherein said camera comprises a cylindrical film chamber, said unit being positioned adjacent to said film chamber such that the axis of said cylindrical shape of said battery chamber extends substantially parallel to an axis of said film chamber.

7. The camera according to claim 1, wherein said train accommodating member comprises a plurality of small stub-axles on which corresponding gears of said gear train are rotatably fitted.

8. The camera according to claim 1, wherein said gear train accommodating member is positioned between said zoom lens barrel and said zoom motor accommodating member.

9. The camera according to claim 1, wherein said camera body comprises a grip portion, said unit being positioned inside said grip portion.

10. The camera according to claim 1, wherein the camera is a compact camera.

11. A camera having a zoom barrel driven by a motor to perform zooming, said camera comprising:

a gear train for transmitting rotation of said motor to said zoom lens barrel; and an accommodating unit, provided as a separate part from the camera body of said camera, which is to be secured to said camera body when said camera is assembled, said accommodating unit comprising: a motor accommodating portion for accommodating said motor; a gear train accommodating portion for accommodating said gear train; and a battery chamber.

12. The camera according to claim 11, wherein said camera body comprises a grip portion, said accommodating unit being positioned inside said grip portion.

13. The camera according to claim 12, wherein said camera body comprises a film chamber, said accommodating unit being positioned in front of, and adjacent to, said film chamber.

14. The camera according to claim 11 wherein the camera is a compact camera.

* * * * *